Oct. 31, 1967     CHIYOICHI IIDA ET AL     3,349,453
CLIP DEVICE
Filed April 27, 1966     3 Sheets-Sheet 1
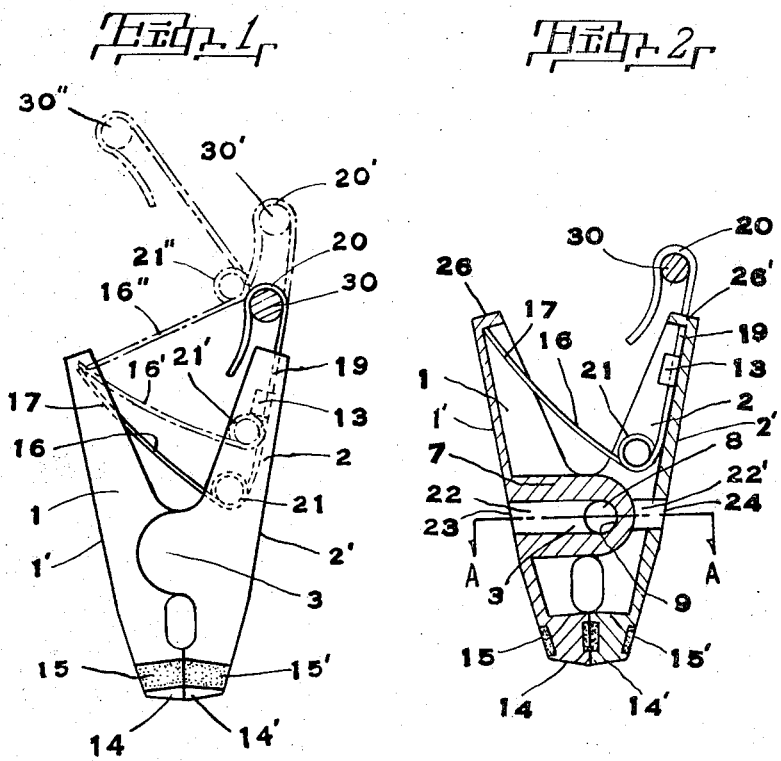
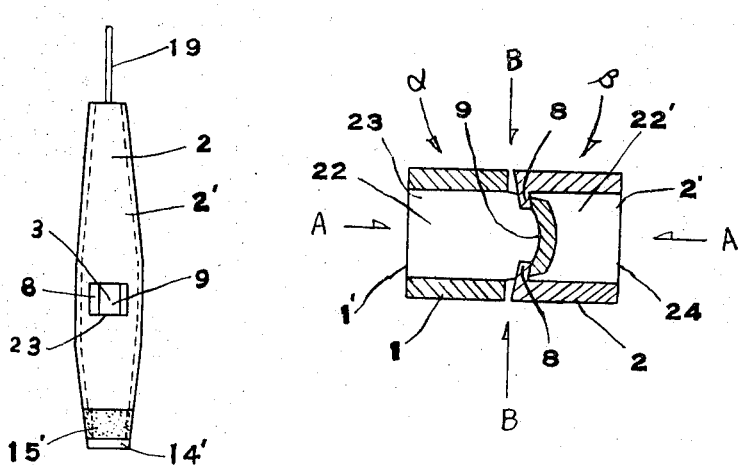

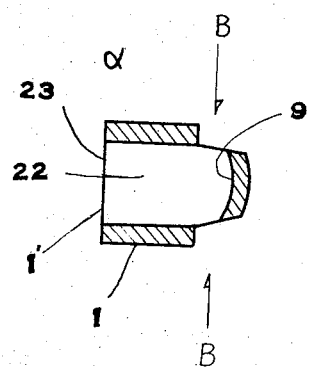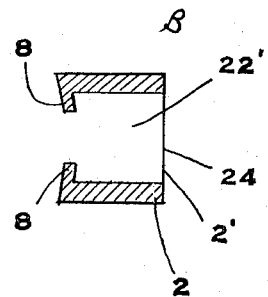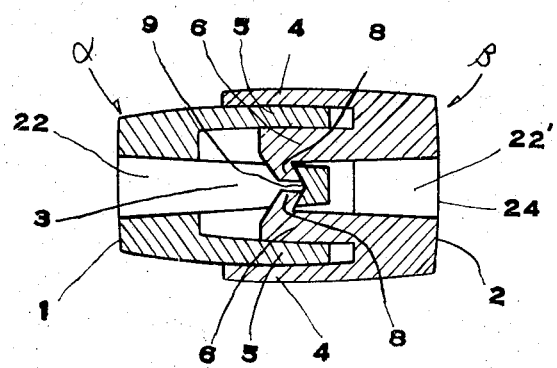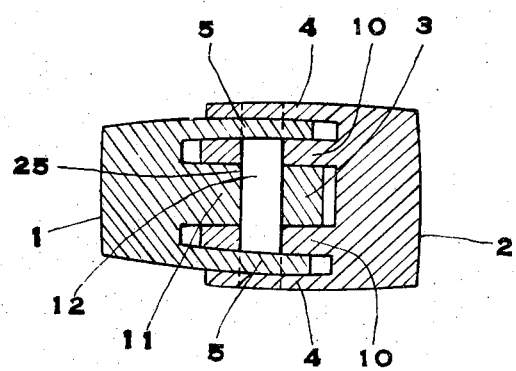

Oct. 31, 1967  CHIYOICHI IIDA ET AL  3,349,453
CLIP DEVICE
Filed April 27, 1966                3 Sheets-Sheet 3
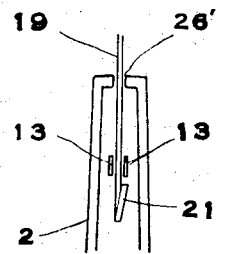
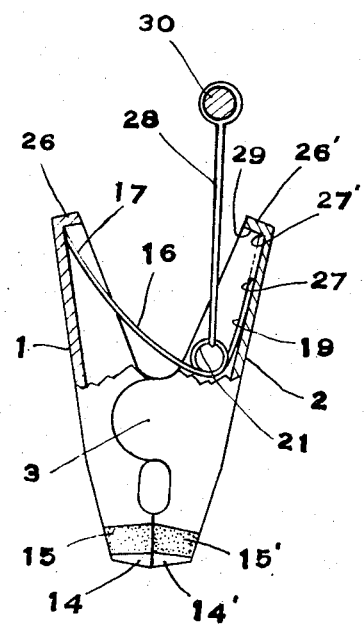
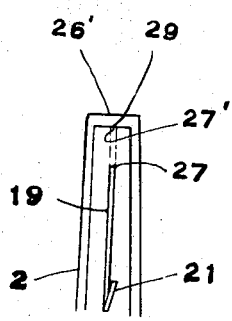
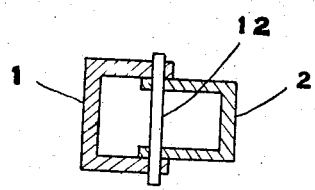

United States Patent Office 3,349,453
Patented Oct. 31, 1967

3,349,453
CLIP DEVICE
Chiyoichi Iida, 10 Kitaterakata, and Hiroshi Yano, c/o Sekiden Kagaku Kogyo Co., Ltd., 2 Jinai-cho 1-chome, both of Moriguchi-shi, Osaka, Japan
Filed Apr. 27, 1966, Ser. No. 545,583
2 Claims. (Cl. 24—252)

ABSTRACT OF THE DISCLOSURE

A pivoted jaw clasp provided with a biasing spring having a hook secured thereto so that the weight of a suspended object will increase the grip of the jaws which are pivotally connected together by hollow members which snappingly lock together and may be provided with matingly engaging offset guides of ear configuration to prevent separation.

---

The present invention relates to a clip device which is an improvement over the clip device described in U.S. Patent No. 3,131,449 granted on May 5, 1964, to one of the present joint inventors.

The clip device described in the above noted United States patent overcomes most of the defects due to the spring means in conventional clip devices.

There are, however, some improvements desired in safety and effectiveness of spring means in the clip device described in said patent. If an object of substantially large weight is put on a clip device of the above-described patented mechanism, it is possible for the clip ends to act to deform the spring beyond the operable V shape configuration into an inoperable L shape configuration, sometimes even until the spring is detached out of the jaws, as it urges the free ends of the jaws apart too much. It will thus be desirable that the deformation of the spring is always controlled within the operable configuration of the spring. Moreover, there is a certain configuration to give the maximum effectiveness of the spring to urge the free ends apart and the clip ends together, but such an optimum configuration will not always be maintained in relation to a variety of loads to be put on a clip device, a substantially heavy load often acting to deform the spring beyond the optimum configuration. It will thus also be desirable that the deformation of the spring is controlled to maintain a configuration to give the maximum effectiveness of the spring while a substantially heavy load is held between the clip ends.

One object of the invention is to provide a pivotal connection of the jaws, to be assembled in a simple process and to be rotated satisfactorily without disengagement, in operation in a clip device of the type shown in said patent.

Another object of the invention is to provide a pivotal connection of the jaws to simplify the structure, and prolong the durability, of the die for molding a clip device of the type shown in said patent.

A further object of the invention is to provide guide means on the pivotal connection in a closely lapped relation to rotate the jaws in functional and durable manner without any deflection and deformation in respect of the pivotal connection in a clip device of the type described.

A further object of the invention is to provide a safety means to retain the spring within the configuration operable for a clip device which primarily comprises a pair of jaws and a spring means, the pair of jaws each including a clip end and a free end opposite to the clip end, whereby the weight of an object held between the clip ends acts to deform the spring and to increase the effectiveness of the spring to urge the free ends apart and the clip ends together in proportion to the weight of the object.

A further object of the invention is to maintain the spring in a configuration to give the maximum effectiveness of the spring against a substantially large load held by such a clip device, wherein the weight of an object held between the clip ends acts to deform the spring and to increase the effectiveness of the spring to urge the free ends apart and the clip ends together in response to the weight of the object.

Other objects and various features of the invention will be more apparent from the following description of preferred forms of the invention shown by way of example in the accompanying drawing in which:

FIG. 1 is a front view of a clip device in accordance with the invention showing the relation of the spring means and stopper in dotted lines, FIG. 2 is a vertical section of FIG. 1, FIG. 3 is a side elevation of FIG. 1, FIG. 4 is a fragmentary sectional view, approximately taken on the line A—A of FIG. 2, showing a pivotal connection of male and female elements, FIG. 5 shows the male member of the pivotal connection of FIG. 4, FIG. 6 shows the female member of the pivotal connection of FIG. 4, FIG. 7 is a fragmentary sectional plan view of another form of pivotal connection, FIG. 8 is a fragmentary sectional plan view of still another form of pivotal connection, FIG. 9 is a fragmentary view showing the spring stopper in FIG. 1, FIG. 10 is a front view partially in vertical section of another embodiment of the invention, FIG. 11 is a fragmentary view showing the spring stopper of FIG. 10, and FIG. 12 is a fragmentary sectional plan view of a pivotal connection of conventional clip device.

In the embodiment of the invention illustrated in FIG. 2, the clip device includes a pair of jaws 1 and 2 having clip ends 14, 14' fitted with friction means 15, 15', free ends 26, 26' opposite to the clip ends 14, 14', and body portions 1', 2' intermediate the both ends, respectively.

The body portion 1' is integrally provided with a male element α as shown separately in FIG. 5, while the body portion 2' is integrally provided with a female element β as shown separately in FIG. 6. The male element α has a slot 22 which is closed at one end 9 but opened at the other end 23 in the longitudinal A—A direction, while the female element β has a slot 22' which is opened at both ends in the longitudinal A—A direction. The longitudinally closed end 9 of male element α is, however, opened in the lateral B—B direction to engage pivotally a dog 8 formed on the slot 22' in the female element β, as best shown in FIG. 4. The numeral 3 indicates the pivot as a whole thus formed, where the jaws 1 and 2 are connected in a pivotal relation.

The jaws 1 and 2 are loaded with a spring 16 consisting of a strip of metal curved in a V shape which at one side 17 engages the free end 26 of jaw 1 in a fixed relation, but at the other side 19 goes through the free end 26' of jaw 2 in a slidable relation, in a manner so that it continually urges the free ends 26, 26' apart and therefore the clip ends 14, 14' together so as to grasp an object between the clip ends 14, 14' by the intermediary of friction means 15, 15' made of rubber or similar matter. The spring 16 is provided with a helical loop 21 between the both sides 17, 19 of spring 16. The helical loop 21 is structurally to increase the spring force to urge the free ends 26, 26' apart.

After it passes through the free end 26' of jaw 2, the spring 16 is formed integrally to be a hanger means 20 to engage a support 30 which is fixed outside the clip device.

The helical loop 21 is functionally engageable with a spring stopper 13 which is provided on the jaw 2 to retain the spring 16 within the operable configuration as it slides along the jaw 2 to be deformed to increase its effectiveness to urge the free ends 26, 26' apart and the clip ends 14, 14' together so as to grasp an object firmly between the clip ends 14, 14' in proportion to the weight of the object. The spring stopper 13 is located, where the spring 16 is deformed, in relation to the helical loop 21, into a configuration to maximize its effectiveness to urge the free ends 26, 26' apart and the clip ends 14, 14' together so as to grasp the object most firmly between the clip ends 14, 14'. Moreover, the spring stopper 13 is so formed as to guide the spring 16 to slide up and down through it without deflection.

In the assembling of the clip device, the jaws 1 and 2 are easily engaged into the pivotal connection without requiring any additional process or tool. The male element α of jaw 1 is manually pressed into the female element β of jaw 2 so that the dog 8 of the female element β engages the end 9 of male element α. Once they are engaged in pivotal relation, the male and female element are not easily disengaged. And they rotate quite satisfactorily in a pivotal relation.

In the manufacture of the clip device, the die for instance to mold the clip from synthetic resin is substantially simplified in structure, because it does not require any patricular means or formation to provide a lateral pin hole for the pivotal connection of jaws 1 and 2. The longitudinal slots 22 and 22' are sufficient for this purpose. A pair of openings 23 and 24 facilitate the formation of slot 22 and 22' without damaging the simplification of the die. And the simplification of structure naturally prolongs the durability of the die.

In FIG. 7, the pivot 3 is provided with a plurality of guide means formed to be ear-like offsets 4 and 5 from the male element α and female element β of jaws, respectively, in a relation closely lapped but pivotally rotatable with each other and with the pivot 3 so that they not only guide the rotation of pivot 3 without deflection but also they themselves perform a pivotal function with sufficiently large contact surfaces.

The clip device provided with the offsets 4, 5 as illustrated in FIG. 7 is operated quite similarly to the device illustrated in FIG. 4, but it is greatly improved in function and durability of the pivotal connection. The jaws 1 and 2 are never liable to deflect from each other in repeated rotation on the pivot 3 with a considerable force of spring 16 to open and close the clip ends 14, 14' because they are in a closely guided relation with the ear-like offsets 4, 5. In addition the offsets 4, 5 themselves perform a pivotal function with sufficiently large contact surfaces. The exclusion of the deflection not only permits the jaws to rotate satisfactorily on the pivot 3, but also permits the clip ends 14, 14' to hold an object in the desired position between them. Moreover, the pivotal connection is protected from deformation to be caused inevitably from the deflection of the jaws around the pivot. The pivotal connection is therefore not at all liable to be loosened or broken.

The clip device provided with the offsets 4, 5 as illustrated in FIG. 7 is manufactured without any significant complication of the die because the ear-like offsets 4, 5 do not require any lateral means or formation to be added in the structure of the die. The jaws 1 and 2 are assembled by easy manual pressing of the male element α with the offset 5 into the female element β with the offset 4, similarly to those without such offsets.

In FIG. 8, the pivot 3 is provided with a plurality of guide means similar to the pivot shown in FIG. 7, but it is connected with a pin 12 which is inserted in its position, either into a groove 25 formed through a male element 11 and female element 10 interior the offsets 5, or into a hole formed through both the offsets 4 and 5 as well as both the elements 11 and 10; in the former case the pin 12 is inserted into the groove 25.

The clip device provided with the offsets 4, 5 on the pivotal pin 12 as illustrated in FIG. 8 is much more reliable in operation, and durable in service, of pivotal pin-connection than those clothespins of conventional type with a pivotal pin as illustrated in FIG. 12, because the jaws 1 and 2 shown in FIG. 8 in accordance with the invention are never liable to deflect from each other as they rotate on the pivotal pin 12 with the guide means of the ear-like offsets 4, 5.

In the operation of the clip device, the free ends 26, 26' of jaws 1 and 2 are initially closed together by the human fingers applied on them against the spring force. This rotates the jaws 1 and 2 about the pivot 3 to open the clip ends 14, 14' apart and thereby permit an object to be inserted between them. When the fingers are removed from the free ends 26, 26', the spring force returns the free ends 26, 26' apart to the original position. This rotates the jaws 1 and 2 contrarily about the pivot 3 to close the clip ends 14, 14' together and thereby grasp the object firmly between them. The clip device now holding an object is then engaged to the support 30 on the hanger means 20 in vertical hanging relation. Then the clip device as a whole is pulled downward by the gravity of the object. Actually, however, the spring 16 does not go down but remains in the original position as it engages the support 30 which is fixed outside the clip device, while the jaws 1, 2 go down together with the object grasped between the clip ends 14, 14'. In other words the spring 16 goes upward relatively to the jaws 1, 2. This lets the spring 16 slide upward along the jaw 2 to be deformed in relation to one of its ends fixed at the free end 26 of jaw 1 so as to act like a lever to urge the free ends 26, 26' apart further and therefore the clip ends 14, 14' together further to the effect that the object is grasped more firmly between the clip ends 14, 14' than the original spring force attributed to the specific elasticity of the spring. As the spring 16 is deformed to act to urge the free ends 26, 26' apart in proportion to the weight of the object, the clip ends 14, 14' are closed together in proportion to the weight of the object.

The spring stopper 13 serves as a safety means to retain the spring 16 within the operable configuration of the spring. In FIG. 1, the spring is in a configuration 16–21–20 when no load is held between the clip ends 14, 14'. The spring 16 slides upward along the jaw 2 to be deformed in proportion to the weight of an object held between the clip ends 14, 14', until the loop 21 engages the spring stopper 13 in a blocked relation and thereby the spring 16 is retained in an operable V shape configuration 16'–21'–20'. If however there be no such means provided to retain the spring 16 as the spring stopper 13, an object of substantially large weight held between the clip ends 14, 14' would make the spring slide further upward to be deformed beyond the operable V shape configuration, and would sometimes even detach it out of the jaws 1, 2, as schematically illustrated in a configuration 16"–21"–20" in FIG. 1.

The effectiveness of spring 16 to urge the free ends 26, 26' apart and the clip ends 14, 14' together is increased continuously as the spring 16 slides upwards along the jaw 2 to be deformed in proportion to the weight of an object held between the clip ends 14, 14', until it reaches the maximum where the spring is in an optimum configuration 16'–21'–20' shown in FIG. 1. And the spring 16 is maintained fixedly in the optimum configuration in the engaging relation of spring stopper 13 and helical loop 21 for further increase in the weight of the object.

The spring stopper 13 also serves to help the spring 16 slide properly along the jaw 2. As shown in FIG. 9, the spring 16 slides up and down without any deflection from the right course through the guide passage formed in the spring stopper 13 so as to be deformed without any loss in the effectiveness of spring 16 to be caused by such a deflection.

Another embodiment of the invention is illustrated in FIG. 10 where the spring means is confined to the jaws in a compact configuration. Like numbers designate like members as illustrated in the preceding figures.

In FIG. 10, the spring 16 is not long enough to go through, but cut short of, the free end 26' of jaw 2. The numeral 27 indicates the end of spring 16 at the side 19. The end 27 of spring 16 is not formed integrally to be a hanger means, but the helical loop 21 located between the both sides 17, 19 of spring 16 is connected with a hanger means 28 which is provided separately of the spring 16. The free end 26' of jaw 2 is completely closed to form a spring stopper 29 which is engageable with the end 27 of spring 16 to retain the spring 16 within the operable configuration as it slides along the jaw 2 to be deformed to increase its effectiveness to urge the free ends 26, 26' apart and the clip ends 14, 14' together so as to grasp an object firmly between the clip ends 14, 14'. The spring 16 is designated so that, when the end 27 engages the spring stopper 29 at a location 27' as best illustrated in FIG. 11, it is deformed into a configuration to maximize its effectiveness to urge the free ends 26, 26' apart and the clip ends 14, 14' together so as to grasp the object most firmly between the clip ends 14, 14'.

The clip device of compact design as illustrated in FIG. 5 is operated quite similarly to the preceding embodiment.

It will thus be seen that the clip device in accordance with the invention is functional in operation, durable in service, and simplified in manufacture, of the pivotal connection. Moreover, the clip device in accordance with the invention is improved in safety and effectiveness of the spring means as compared with said previously patented clip device.

While preferred embodiments of the invention have been illustrated by way of example in the drawings and particularly described, it will be understood that modifications may be made in the shown embodiments. Moreover, the features of the embodiments shown in the drawings are mutually interchangeable so far as they are compatible.

What we claim is:

1. A clip device comprising a pair of jaws, each jaw including a clip end, a free end opposite to said clip end and a body portion intermediate said both ends; a pair of male and female elements pivotally connecting said body portion of said pair of jaws, said male element being formed integral on one of said pair of jaws and provided with a slot one end of which is longitudinally closed but laterally opened and the other end of which is longitudinally opened, said female element being formed integral on the other of said pair of jaws and provided with a slot both ends of which are longitudinally opened, a dog means being formed on said female element to pressingly engage with said lateral opening at said end of said male element, whereby said male and female element are put into pivotal engagement.

2. A clip device according to claim 1 wherein the pivotal means connecting said body portions of said pair of jaws include a plurality of guide means outside said pivotal means in a relation closely lapped but pivotally rotatable with each other, whereby said guide means guide said pivot in the functioning thereof.

References Cited

UNITED STATES PATENTS

| 148,088 | 3/1874 | Reid et al. | 24—84 |
| 2,450,512 | 10/1948 | Helwig | 223—96 |
| 2,590,881 | 4/1952 | Morgan | 24—137.5 |
| 3,131,449 | 5/1964 | Ilda | 24—137.5 |

FOREIGN PATENTS

| 151,856 | 6/1953 | Australia. |
| 70,286 | 11/1949 | Denmark. |
| 804,675 | 4/1951 | Germany. |

DONALD A. GRIFFIN, *Primary Examiner.*